Patented Feb. 9, 1932

1,844,381

UNITED STATES PATENT OFFICE

LLOYD C. DANIELS, OF CRAFTON, PENNSYLVANIA, ASSIGNOR TO THE SELDEN COMPANY, OF PITTSBURGH, PENNSYLVANIA, A CORPORATION OF DELAWARE

PRODUCTION OF DIBENZANTHRONE

No Drawing. Application filed January 26, 1931. Serial No. 511,443.

This invention relates to the production of dibenzanthrone compounds and more particularly to dibenzanthrone and isodibenzanthrone.

Dibenzanthrone has been produced in the past by caustic potash fusion of benzanthrone in the presence of an aldehyde sugar, usually dextrose. The yields obtained are poor, being not more than 50% based on the benzanthrone used.

The present invention is based upon the discovery that improved results can be obtained when ketoses, that is to say carbohydrates containing the keto instead of the aldehyde group, are used as reducing agents. While ketoses may be used generally, I prefer for economic reasons to use either fructose or formose, which is the crude product obtained by treating formaldehyde with lime. Surprising as it may seem, crude ketoses operate as effectively as purified ketoses. Other ketoses may be used but are for the most part very expensive and are therefore of less interest commercially although effective reducing agents.

The following specific examples give a few illustrations of the invention, which however is in no sense limited to the specific details therein set forth.

Example 1

100 parts by weight of benzanthrone are ground with from 5 to 20 parts of fructose and added slowly at 220° C. to a mixture of from 400 to 500 parts of 85–95% caustic potash. After the addition of the benzanthrone, the mixture is heated slowly to 230–240° C. and held at that temperature for 45 minutes, after which the dibenzanthrone is isolated by pouring the melt into water, oxidizing the leuco compound with air, and filtering in the usual manner. The product obtained is of excellent quality, giving bright and strong dyeings.

Example 2

100 parts of benzanthrone are ground with 15 to 25 parts of crude formose obtained by treating an aqueous formaldehyde solution with lime and containing about 75% of formose. The mixture is added slowly at 220° C. to 400–500 parts of 85–95% caustic potash and the fusion carried out as described in Example 1. As good a yield of dibenzanthrone of as high quality is obtained as when pure formose is used.

What is claimed as new is:

1. A method of fusing benzanthrone to produce dibenzanthrone, which comprises fusing benzanthrone with caustic alkali in the presence of a ketose.

2. A method of fusing benzanthrone to produce dibenzanthrone, which comprises fusing the benzanthrone with caustic alkali in the presence of a keto-hexose.

3. A method of fusing benzanthrone to produce dibenzanthrone, which comprises fusing the benzanthrone with caustic alkali in the presence of fructose.

4. A method of fusing benzanthrone to produce dibenzanthrone, which comprises fusing the benzanthrone with caustic alkali in the presence of formose.

Signed at Pittsburgh, Pennsylvania, this 23rd day of January, 1931.

LLOYD C. DANIELS.